PRESET TYPE VARIABLE RESISTOR

Filed Aug. 31, 1955

Inventors
Wilbert H. Budd
Howard F. Christner, Jr.
Wayne A. Barden
Joel L. Kehres
Arthur M. Daily
By Ira Milton Jones
Attorney Inventors
Wilbert H. Budd
Howard F. Christner, Jr.
Wayne A. Barden
Joel L. Kehres
Arthur M. Daly
By Ira Milton Jones
Attorney Inventors
Wilbert H. Budd
Howard F. Christner, Jr.
Wayne A. Barden
Joel L. Kehres
Arthur M. Daily By Ira Milton Jones
Attorney Jan. 27, 1959 W. H. BUDD ET AL 2,871,328

PRESET TYPE VARIABLE RESISTOR

Filed Aug. 31, 1955 4 Sheets-Sheet 4

Inventors
Wilbert H. Budd
Howard F. Christner, Jr.
Wayne A. Barden
Joel L. Kehres
Arthur M. Daily
By Ira Milton Jones
Attorney 2,871,328

PRESET TYPE VARIABLE RESISTOR

Wilbert H. Budd, Howard F. Christner, Jr., Wayne A. Barden, and Joel L. Kehres, Elkhart, Ind., and Arthur M. Daily, Edwardsburg, Mich., assignors to Chicago Telephone Supply Corporation, Elkhart, Ind., a corporation of Indiana Application August 31, 1955, Serial No. 531,802

7 Claims. (Cl. 201—62)

This invention relates to variable resistors and refers more particularly to variable resistance control units of the so-called preset type.

Preset variable resistance controls are now used extensively in television receivers to facilitate critical adjustments in the various sensitive electrical circuits of a television receiver required for good quality reception. These circuits are usually adjusted before the television receiver leaves the factory and need be adjusted only infrequently thereafter. Consequently, present controls may be and usually are located in relatively inaccessible locations on the television receiver but it is an advantage to have all the preset controls located at substantially the same place on the receiver.

Since preset controls are adjusted infrequently, it is, of course, not necessary that they be as free of noise or as capable of withstanding great numbers of operational cycles as the controls that are regularly operated by the set owner making the desired station selections and other adjustments. However, it is still highly important that preset controls meet the high standards of quality and dependability which set manufacturers and owners have come to expect.

In recognition of these facts, and with a view toward meeting the demands constantly being made upon control manufacturers to reduce the price of the components they make, it is an object of this invention to provide a variable resistance control device which is especially designed for preset applications, which fully meets all of the requirements of a high quality reliable and dependable control of this type, but which nevertheless can be mass produced at a cost much lower than has heretofore been possible.

Since as above noted, preset controls are desirably grouped in one location on the television receiver, it is another object of this invention to provide a preset variable resistor which lends itself well to the multiplication or grouping of several such controls in a single subassembly ready for incorporation as a single unit, into a television receiver, thus reducing the number of parts to be handled by the set manufacturer, and lowering his assembly costs.

With a view toward achieving low production costs, it is another object of this invention to provide a variable resistor wherein the contactor assembly has no shaft as such, but instead is guided in its resistance adjusting motion by a boss on the knob of the control received in an opening in the base in the control.

Still another object of this invention is to provide a variable resistor which not only is designed for ready adaptation to and assembly into printed circuits, but in fact employs the printed circuit technique to simplify and reduce the manufacturing cost of the resistor.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which.

Referring now to the accompanying drawings in which like numerals indicate like parts throughout the several views, it is at once apparent that the variable resistor of this invention is distinguished by the fact that the resistance element, or more accurately the means providing the resistance path, and also the conductive path are both carried by a common base which consists simply of a flat sheet of insulating material. In fact both the resistance element and the conductive path are bonded directly to the base.

Another distinguishing characteristic of the present invention is in the manner in which the bridging contactor is mounted and guided for movement. Thus, in some forms of the invention the base has a slot or a pair of slots extending lengthwise of the resistance element and conductive path, and the mounting for the bridging contactor includes a part or parts slidably received in the slot or slots to thereby constrain the contactor to linear travel. In another form of the invention wherein the bridging contactor is rotatable, it is the reception of the mounting for the contactor in a hole in the base which constrains the contactor to its desired rotary adjustment and also serves as part of the means for mounting the contactor.

Still another distinguishing characteristic of this invention is the fact that the conductive path which parallels the resistance element is bonded directly to a surface of the base and is applied by any of the several metal spraying techniques developed for the manufacturers of printed circuits.

Figure 1:
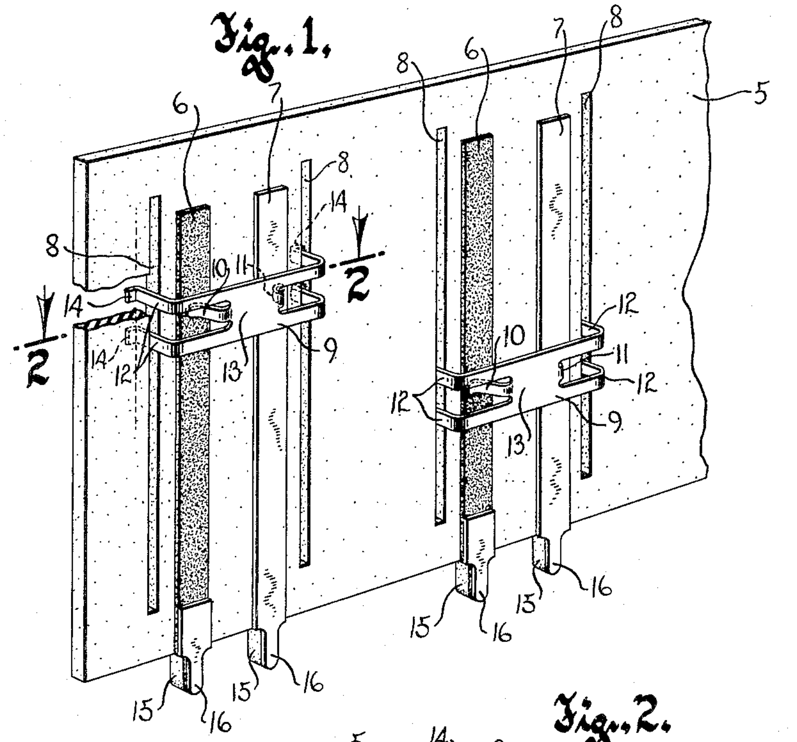
Figure 1 is a perspective view illustrating one adaptation of this invention and showing particularly the manner in which the invention facilitates the grouping of a number of variable resistors into a single unitary subassembly.
Figures 2, 4:
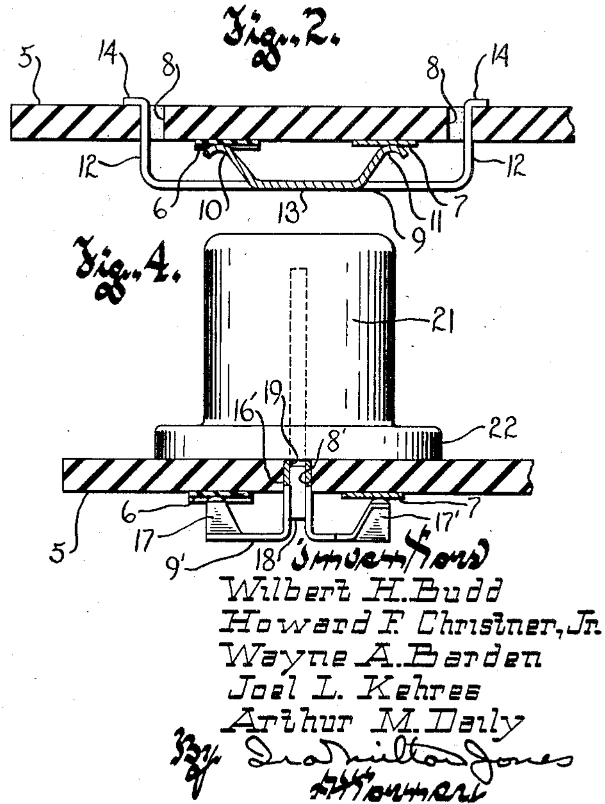
Figure 2 is a cross sectional view through Figure 1 on the plane of the line 2—2.
Figure 4 is a cross sectional view through Figure 3 on the plane of the line 4—4.

In the light of these general observations, reference is now specifically had to Figures 1 and 2 of the drawings. The embodiment of the invention illustrated in these views comprises a base 5, in the form of a flat rectangular sheet or piece of insulating material. Any suitable insulating material may be employed as will be well understood by those skilled in the art.

Since the invention contemplates the grouping of several variable resistors into one composite structure or subassembly, two complete variable resistors are illustrated as being mounted upon the base 5, but it should be understood that any number of such resistors could be mounted thereon, providing of course that the base is long enough.

Each resistor in the embodiment of the invention shown in Figures 1 and 2, comprises a resistance element 6 extending in a straight line across the front face of the base 5, and a conductive path 7 parallel to but spaced from the resistance element. The resistance element, or perhaps more accurately, the resistance path, preferably is of the carbonaceous type applied directly to the base by spraying, brushing or other suitable methods, and the conductive path 7 is preferably applied by any of the several metal spraying techniques which have been developed for the manufacturers of printed circuits.

Alongside and parallel to the outer edges of the resistance element or path 6 and the conductive path 7, are elongated slots 8 in the insulating base. These slots provide guidance for a bridging contactor 9 which is slidably mounted on the base for movement lengthwise along the resistance element and conductive path. The bridging contactor is stamped and formed from suitable sheet metal and has resilient contact fingers 10 and 11 respectively engaging the resistance element and the conductive path. In top plan the contactor is shaped to have parallel spaced side members 12 connected at the middle by a cross bar 13 from which the resilient fingers 10 and 11 extend to be disposed between the two side members 12. The side members 12 have their ends bent down and passed through the slots 8 and the extremities thereof are bent sharply outwardly to provide abutments 14 which bear against the rear face of the base. As can no doubt be appreciated the elements of the bridging contactor are so proportioned that the engagement of the abutments 14 upon the rear face of the base reacts against the spring tension on the contact fingers 10 and 11, to provide the correct contact pressure and hold the contactor in any position of adjustment along the length of the parallel resistance element and conductive path.

The terminals for the resistor consist of tongues 15 integral with and projecting from one edge of the insulating base, and having one side thereof coated or covered with a conductive metallic film 16. These conductive films may be applied in the same manner as the conductive path 7, and extend inwardly from the edge of the base, with one of them electrically connected to the resistance element 6 and the other forming substantially a continuation of the conductive path 7. If desired the metallic coating or film 16 of the terminals may be applied simultaneously with the conductive path 7 by using a suitable masking technique.

Attention is directed to the fact that as the bridging contactor 9 is slid along the resistance element and conductive path to effect the desired adjustment of the resistor, it is guided and constrained to proper linear movement by the engagement of its leg portions in the slots 8.

Figure 3:
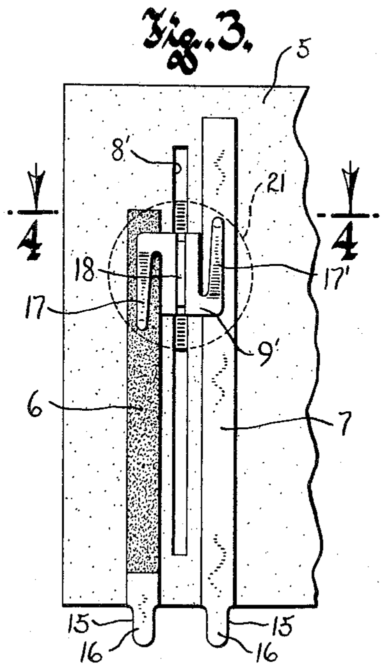
Figure 3 is a front plan view of a variable resistor embodying the principles of this invention in a form slightly different from that shown in Figure 1.
Figure 5:
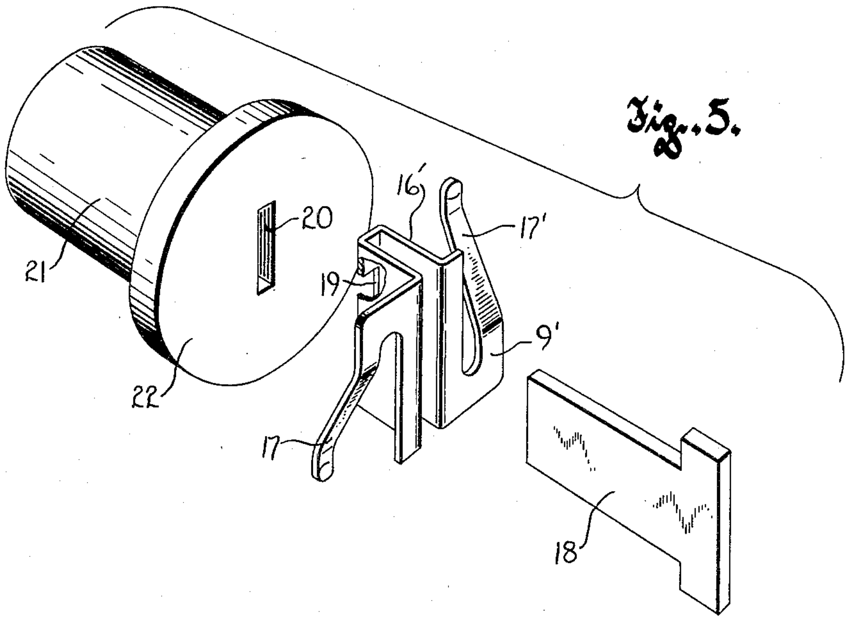
Figure 5 is a perspective view of the bridging contactor of that form of the invention shown in Figure 3, and the means for mounting and actuating it, with the parts separated but in their proper order of assembly.

The embodiment of the invention illustrated in Figures 3, 4 and 5, differs from that just described principally in the fact that instead of two slots to guide the bridging contactor there is only one slot 8' located between the resistance element and the conductive path; and, of course, the substitution of a single slot for the two slots entails a differently constructed bridging contactor. Accordingly, the bridging contactor 9' has a generally U-shaped formation to provide a central flat sided portion 16' of a size to be slidably received in the slot 8'. The legs of the U-shaped structure are directed outwardly over the base, and have oppositely extending spring contact fingers 17 and 17' bearing on the resistance element and conductive strip or path respectively.

The contactor is held assembled with the base by a T-shaped key 18, passed through a slot or hole 19 in the bight of the U-shaped contactor and anchored in a socket 20 in an actuator button or knob 21, it being understood that the underside of the head 22 of the T-shaped key bears against the inside surface of the bight of the U-shaped contactor when the parts are properly assembled.

An advantage of the contactor employed in this form of the invention is that its spring contact fingers 17 and 17' are quite long, and that the contact pressure which they provide is nicely balanced about the axis of the actuator and the contactor because the extremities of the contact fingers lie on a line which passes diagonally through the axis of the contactor assembly.

Figure 6:
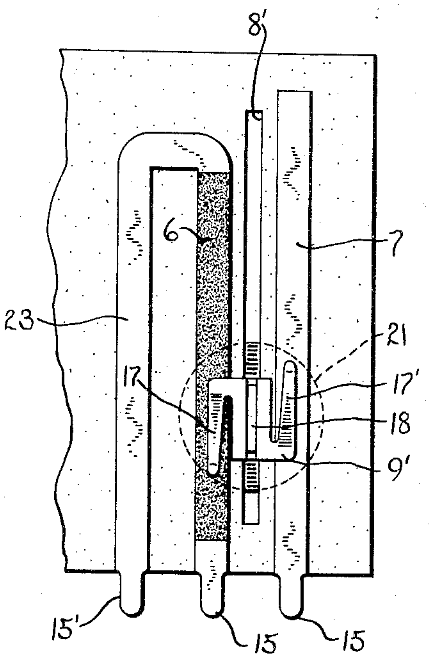
Figure 6 is a view similar to Figure 3, but illustrating the manner in which the resistor is adapted for use as a potentiometer.

The embodiment of the invention illustrated in Figure 6 is identical to that of Figures 3, 4 and 5, except that instead of only two terminals 15, that is, one for the resistance element and one for the conductive strip, the Figure 6 embodiment of the invention has three such terminals, one of which 15' is connected by a conductive strip 23 with the end of the resistance element opposite that to which the terminal 15 of the resistance strip is connected. Accordingly, the structure shown in Figure 6 adapts the variable resistor to use as a potentiometer.

Figure 7:
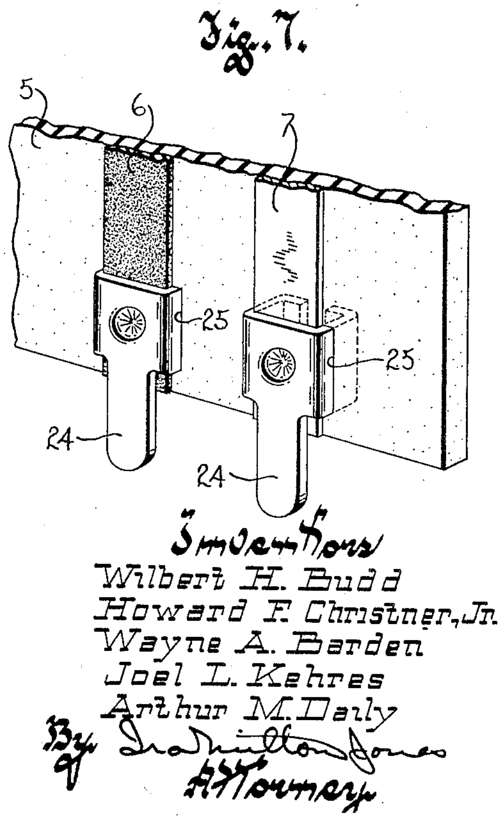
Figure 7 is a perspective view of the terminal portion of the resistor shown in Figure 3, and showing how the invention lends itself to utilization of a terminal construction heretofore found to be highly practical and desirable.

If desired, the terminals for the resistance element and conductive path may be formed of sheet metal and clinched in place in the manner disclosed in the pending application filed September 14, 1953, Serial No. 379,912, now United States Patent No. 2,736,783, and as shown in Figure 7. Since such clinched-on terminals have relatively stiff end portions 24, the insulating base need not have the terminal tongues 15, it being sufficient for the terminal portions 24 to project beyond the adjacent edge of the base to provide the plug-in prongs which are a feature of this invention. The manner in which the terminals are secured in place, and the way in which they make good electrical connection with the resistance element and conductive strip is fully disclosed and covered in the aforesaid copending application; hence no description thereof is needed here, suffice it to say that the insulating base has slots 25 through which the clinching arms of the terminals pass.

Figures 8, 9:
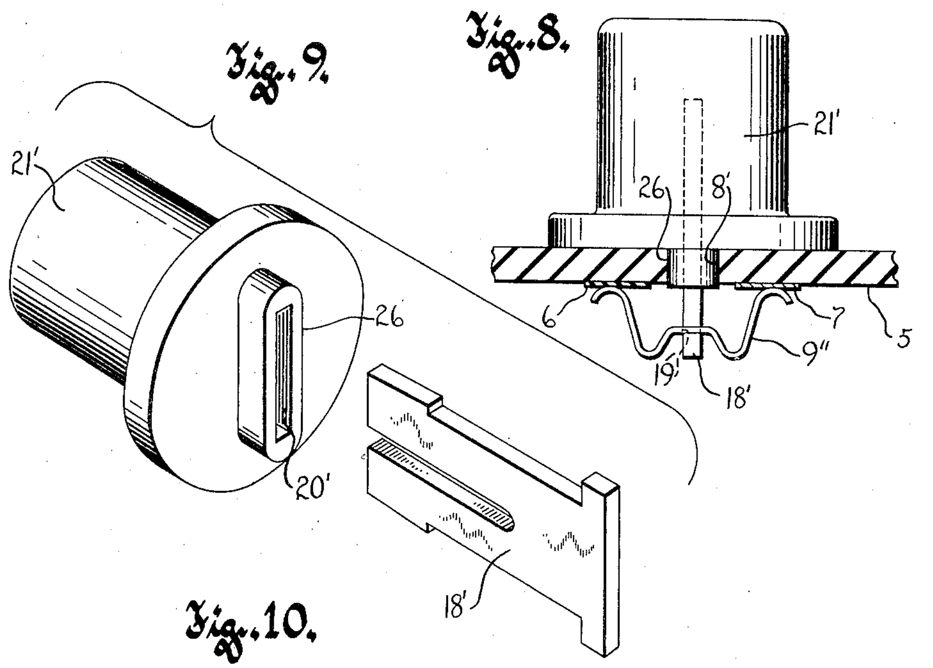
Figure 8 is a cross sectional view similar to Figure 4 but illustrating a slightly modified manner of mounting the bridging contactor.
Figure 9 is a perspective view of the elements of the contactor mounting shown in Figure 8.

A slightly modified contactor assembly which may be used in lieu of the embodiment of the invention disclosed in Figures 3, 4 and 5, is illustrated in Figures 8 and 9. This contactor assembly is characterized by the fact that the actuating knob 21' has a boss 26 projecting from its inner end and slidably received in the slot 8' to guide the contactor assembly in its resistance adjusting motion. The connection of the contactor 9'' with the actuating knob 21', as before, is effected by means of a T-shaped key 18', the stem of which passes through the slot or hole 19' in the contactor and is anchored in a socket 20' which opens through the boss 26. Preferably the stem of the T-shaped key is bifurcated as shown to facilitate anchoring the same in its socket 20'.

In this manner of mounting the bridging contactor (Figures 8 and 9) it is especially clear how the invention obviates the need for the shaft of the conventional resistor, and how the guiding function usually effected by the shaft is performed by a part of the contactor assembly.

Figure 10:
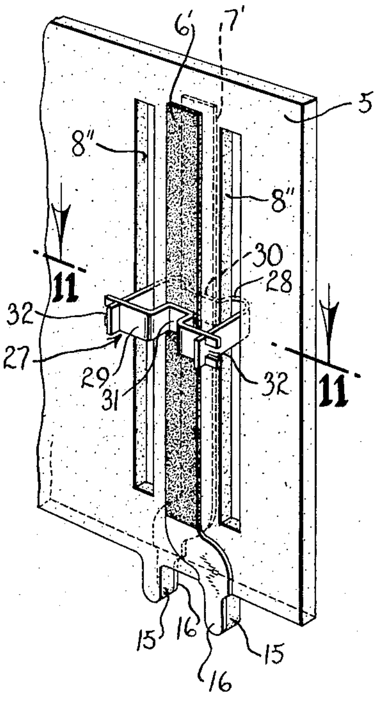
Figure 10 is a perspective view of a variable resistor embodying this invention in a form which differs from the embodiment of the invention disclosed in the previously identified views, principally in that the resistance element and conductive path are at opposite sides of the base rather than on the same side thereof.
Figure 11:
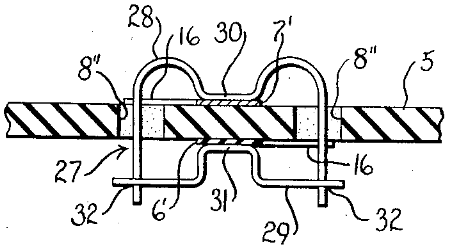
Figure 11 is a cross sectional view through Figure 10 on the plane of the line 11—11.

In the embodiments of the invention thus far described, both the resistance element and the conductive path are on the same side or face of the base. It may be desirable in some instances however, to have them located at opposite sides of the base, and in that case the construction shown in Figures 10 and 11 may be employed. As there shown, the resistance element 6′ and the conductive path 7′ are disposed back to back at opposite sides or faces of the base between a pair of parallel spaced apart slots 8″. The terminals for the resistance element and conductive path, as before, are provided by parallel metal covered tongues 15 projecting from an edge of the base, but in this instance, the conductive films 16 which form the metal covering and which lead to the resistance element and the conductive path are on opposite sides of the tongues 15.

The bridging contactor 27 in this case comprises two cooperating stamped metal parts 28 and 29, one at each side of the base. The part 28 is generally U-shaped and has its arms passing through the slots 8″, connected to the part 29. Each of the parts 28 and 29 has a central inwardly directed humped portion providing a contact surface which rides upon its respective path. The contact portion 30 of the part 28 rides on the conductive path 7′ while the contact portion 31 of the part 29 rides on the resistance element 6′. Interengaging tongues and notches 32 at the extremities of the parts 28 and 29 provide the means for holding the two parts together, and the relative proportions of the parts are such that the inherent resilience thereof causes their respective contact portions to firmly engage the resistance element and conductive path and pinch the base therebetween.

Figures 12, 13:
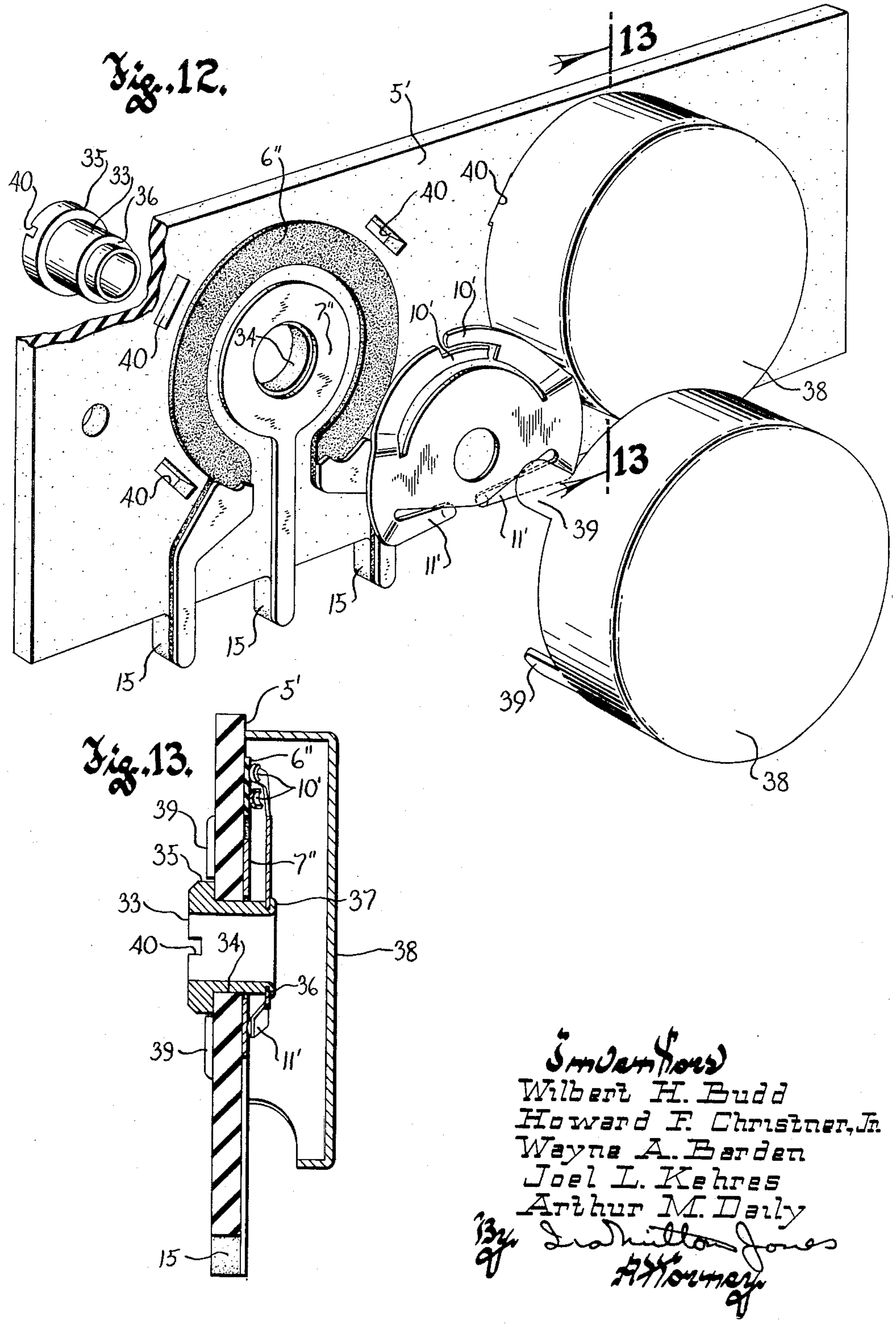
Figure 12 is a perspective view of still another form of this invention, which is characterized chiefly by the fact that the bridging contactor is rotatable instead of linearly slidable.
Figure 13 is a cross sectional view through Figure 12 on the plane of the line 13—13.

The advantage of no actuating shaft as well as all of the other advantages of this invention are attainable in the rotary type of control as well as with the straight line motion controls thus far described; and in Figures 12 and 13 one adaptation of the invention to the rotary type of control has been illustrated. As there shown the same facility for grouping is present in this form of the invention; thus a common base 5′ consisting of a flat sheet of suitable insulation has the desired number of variable resistor units mounted thereon. Each unit comprises an arcuate resistance element or strip 6″ and a circular conductive path or collector ring 7″ both of which are bonded directly to the front face of the base 5′. As in the other embodiments of the invention the resistance element 6″ may be of the carbonaceous type, sprayed, painted, or otherwise applied directly to the surface of the base, and the conductive path 7″ may be applied by the metal spraying technique heretofore referred to.

The terminals are again provided by metal coated tongues 15 projecting from an edge of the base, one for each end of the arcuate resistance element and one for the conductive path or collector ring.

The bridging contactor in this form of the invention, may be like that illustrated in Patent No. Re. 23,750. It consists simply of a sheet metal stamping having a pair of spring fingers 10′ to ride the resistance element and a second pair of spring fingers 11′ to ride the collector ring. The contactor is mounted by being secured to the inner end of a hollow rivet 33 freely rotatably received in a round hole 34 in the base at the center of the collector ring and resistance path. The rivet 33 has a head 35 which bears against the outer or front face of the base, and its opposite rear end is reduced in diameter to provide a shoulder 36 against which the contactor is clamped by the rolled-over edge 37 formed by the rear end portion of the rivet 33 which is relatively thin walled.

Obviously, of course, the spring tension of its contact fingers holds the contactor on the resistance element and the collector ring with the proper contact pressure and maintains the head 35 of the rivet against the front face of the base. The head 35 provides means by which the contactor may be rotated, and if desired, it may have a cross slot 40 to receive a screwdriver or other instrument to facilitate such adjustment.

This rotary form of the invention lends itself well to the incorporation of a protective housing or cover 38 which may consist simply of a stamped cup-shaped casing held to the back of the base by tongues 39 passed through slots 40 in the base, and clinched over the front of the base.

From the foregoing description taken with the accompanying drawings, it will be apparent to those skilled in the art that the variable resistor of this invention possesses unprecedented simplicity of design and construction, and that in view thereof the manufacturing costs are lowered without in anywise compromising on quality and ability of the control to faithfully and reliably perform its intended function in service.

What we claim as our invention is:

1. A variable resistor comprising: a flat piece of insulating material providing a base for the resistor, and having elongated slot means therethrough, said slot means providing opposed guiding surfaces equispaced from one another along the length of the slot means; a slider mounted on the base and having guide means thereon comprising an electrically conductive guide member having spaced opposite legs, portions of which are slidably received in said slot means and have guide surfaces in juxtaposition to said opposing guiding surfaces of the slot means to constrain the slider to substantially translatory motion along the slot means, said slider having parts thereof disposed upon opposite sides of the base and yieldingly urged towards one another, said parts bearing against the opposite sides of the base so that the base is yieldingly clamped therebetween and the slider is frictionally held in any selected position along the length of the slot means; means providing an elongated resistance path bonded directly to one side of the base and disposed equidistant from one of the opposed guiding surfaces provided by the slot means; means providing an elongated low resistance conductive path bonded directly to one side of the base; said resistance and conductive paths being equidistant from one another; electrically connected spring contact portions carried by the slider, each bearing upon one of said paths to traverse the same as the slider is moved along the slot means; and terminal means on the base, one connected to each of said paths.

2. The variable resistor of claim 1, wherein the resistance path, the conductive path, and the spring contact portions are at one side of the base and the slot means is a single slot between and equispaced from said paths, the sides of the slot comprising said opposed guiding surfaces; wherein said legs project into the slot and are connected with a slider actuator at the other side of the base; wherein said spring contact portions are elongated fingers which are disposed edgewise adjacent to but spaced from the guide surfaces of the legs and lengthwise overlie said paths, each of said fingers being integrally joined at one end to its adjacent leg; and wherein the junctions between the fingers and their legs are remote from one another lengthwise of the slot.

3. The variable resistor of claim 1 wherein the resistance and conductive paths are on the same side of the base; wherein the slot means is a single slot between and equispaced from said paths, and the opposed guiding surfaces are the sides of the slot; and wherein the slider comprises a metal stamping having spaced spring contact fingers bearing on the resistance and conductive paths to electrically bridge them, a U-shaped connector having opposing legs intermediate and integral with the contact fingers and having its bight portion passing through the slot, and an actuating button connected with the bight portion of the U-shaped stamping and bearing against the other side of the base to hold the spring contact fingers under tension.

4. The variable resistor of claim 3 further characterized by the fact that the actuating button is connected to the bight portion of the U-shaped connector by a T-shaped key having the underside of its head bearing against the bight of the U-shaped connector and confined between the legs of the connector to hold it slidingly engaged with the sides of the slot, said key having its stem passing through an opening in said bight and secured in the button.

5. The variable resistor of claim 1 further characterized by the fact that the terminal means comprises spaced tongues integral with and projecting from one edge of the base, and conductive metal films bonded to the base and connecting with said paths, said films extending along the base and out onto said tongues.

6. The variable resistor of claim 1 wherein said paths are disposed at opposite sides of the base; and wherein said spring contact portions are disposed at opposite sides of the base and are resiliently urged toward one another into engagement with said paths.

7. The variable resistor of claim 1 further characterized by the provision of three parallel tongues integral with the base and projecting from an edge thereof adjacent to one end of the resistance path and the conductive path; and terminal means bonded to a surface of the base and extending from each end of the resistance path and from one end of the conductive path onto one surface of each of the projecting tongues so that two of the tongues with the terminal means thereon provide terminals for the opposite ends of the resistance path and the third tongue with its terminal means thereon provides a terminal for the conductive path.

References Cited in the file of this patent

UNITED STATES PATENTS

| | | |
|---|---|---|
| 1,157,868 | Willis | Jan. 11, 1916 |
| 2,242,327 | Rubinstein | May 20, 1941 |
| 2,250,959 | Kelly | July 29, 1941 |
| 2,253,318 | Barrow et al. | Aug. 19, 1941 |
| 2,484,734 | Rahmel | Oct. 11, 1949 |
| 2,625,633 | Warsher | Jan. 13, 1953 |
| 2,644,064 | Jack et al. | June 30, 1953 |
| 2,668,218 | Searle | Feb. 2, 1954 |

FOREIGN PATENTS

| | | |
|---|---|---|
| 56,943 | Germany | Sept. 25, 1890 |